March 26, 1929.  R. G. WILFERT  1,706,685

AUTOMOBILE LIGHT

Filed Feb. 11, 1926

INVENTOR
Robert G. Wilfert
by John W. Frehli
ATTORNEY

Patented Mar. 26, 1929.

1,706,685

UNITED STATES PATENT OFFICE.

ROBERT G. WILFERT, OF FORESTVILLE, OHIO.

AUTOMOBILE LIGHT.

Application filed February 11, 1926. Serial No. 87,477.

The object of my invention is to provide a cheap, simple and highly efficient light for automobiles, which may be used as auxiliary to the regular lights of the automobile or independently if desired.

It is ornamental, is a novelty, yet possesses marked utility and is pleasing to the eye. It can, under certain conditions, also be used as signal light.

It consists essentially of a moving figure, emblem, attachment, or the like, carrying electric lights, in the present instance being a revolving or rotary operating fan, carrying lights, and is usually attached to a motor driven vehicle, in the present instance being attached to the front of the radiator of an automobile; the air striking the blades of the fan revolves the same so that it will describe an annular or rotary path, simulating a ring of light or fire, enhancing the appearance of the vehicle and being useful at the same time, and being attractive and pleasing to the eye.

Its advantages and features will readily become apparent from reading the following specification and claim.

Figure 1:
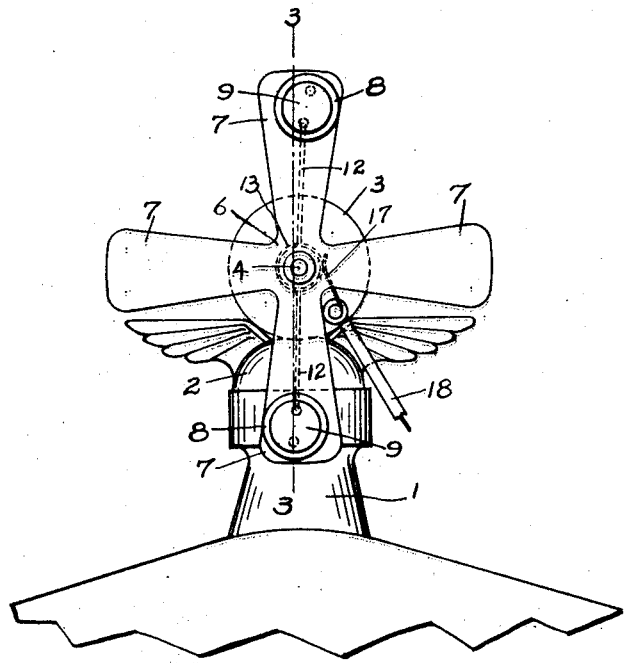
Figure 2:
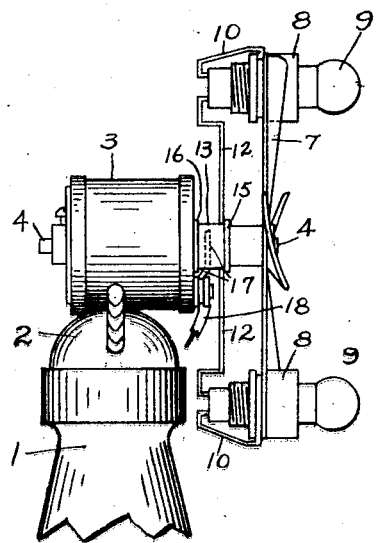
Figure 3:
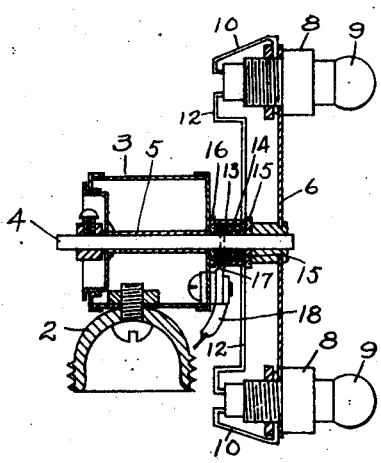

In the accompanying drawing forming part of this specification:

Fig. 1, is a front view of the invention, attached to the radiator of an automobile, said radiator being partly broken away, Fig. 2, is a side elevation of the invention, in connection with the cap of a radiator, partly broken away, and Fig. 3, is a sectional view on line 3—3 of Fig. 1.

In the drawing, 1, shows part of the radiator of an automobile. On this radiator I place a cap 2 usually screwed in position. To this cap is secured a hollow body 3 through which passes a shaft 4, supported in a suitable bearing 5, this body 3 is generally filled with a lubricating material, (not shown).

On the shaft 4 is mounted a fan 6 of usual construction in the present instance having four blades 7.

In the present instance, I mount electric sockets 8 on two of blades, electric light 9 being secured in the sockets. One connection 10 to each socket 8 is grounded to the fan blade; the other connections 12 being connected to a commutator ring 13, running on shaft 4 suitably insulated therefrom by ring 14 and washers 15 and 16. On the body portion 3 is mounted a brush 17 bearing on the commutator ring 13, the brush being suitably insulated from body 3 and connected electrically to a lead wire 18. In this manner the electric current is furnished for the lights if desired or other means may be employed.

In operation, the air current due to the moving of the vehicle strikes the blades 7 and causes them to revolve and the lights being carried by said blades revolve therewith, producing a rotating light.

If the machine is standing and the wind is blowing sufficiently to turn the fan, the same effect will be produced, as if the machine were in motion.

The lights may be of small candle power and yet in rotating make a powerful light effect.

It will be perfectly obvious that the device will add to the usefulness of the vehicle, as for example, in the suburbs or country the rotary light may be seen at a longer distance and forms a safety auxiliary light for the vehicle. Again children and even adults will be inclined to watch such a light, and thus will put them on their guard against stepping into the path of the machine.

While I have set forth one specific means for carrying my invention into effect, it will readily become obvious that I may modify and change the same to some extent, and I wish to be understood as claiming any such modifications which will fall within the scope of this specification and claim.

What I claim as new and my invention and desire to secure by Letters Patent is:—

In a device of the character described, a horizontally disposed stationary cylinder adapted to contain lubricant, a sleeve arranged in the cylinder, a rotatable shaft journaled in the sleeve, extending through the cylinder and receiving lubricant from the cylinder, a fan fixed at the forward end of the shaft, detachable means at the other end of the shaft to prevent the latter from disengaging itself from the sleeve, an insulating ring surrounding the shaft, insulating washers arranged between the ring and cylinder and between the ring and fan, a commutator ring surrounding the insulating ring, electric light bulbs carried by the blades of the fan, and means connecting the commutator to the bulbs for furnishing current to the bulbs while the fan revolves.

In testimony whereof, I affix my signature at Cincinnati, Ohio, this 6th day of February, 1926.

ROBERT G. WILFERT.